United States Patent [19]

Lagushenko et al.

[11] Patent Number: 4,825,125
[45] Date of Patent: Apr. 25, 1989

[54] DISCHARGE LAMP HAVING MULTIPLE CONSTRICTIONS

[75] Inventors: Radomir Lagushenko; Jakob Maya, both of Brookline; Robert Y. Pai, Hamilton, all of Mass.

[73] Assignee: GTE Products Corporation, Danvers, Mass.

[21] Appl. No.: 99,026

[22] Filed: Nov. 2, 1987

Related U.S. Application Data

[63] Continuation of Ser. No. 678,928, Dec. 6, 1984, Pat. No. 4,736,134.

[51] Int. Cl.$^4$ .............................................. H01J 61/33
[52] U.S. Cl. .................................. 313/493; 313/611; 313/634
[58] Field of Search ............... 313/493, 609, 611, 612, 313/634

[56] References Cited

U.S. PATENT DOCUMENTS

| | | | |
|---|---|---|---|
| 2,166,951 | 7/1939 | Germer | 313/612 X |
| 2,916,645 | 12/1959 | Lemmers et al. | 313/109 |
| 2,973,447 | 2/1961 | Aicher et al. | 313/109 |
| 3,098,945 | 7/1963 | Lemmers | 313/109 |
| 3,897,233 | 7/1975 | Szilagyi | 65/109 |
| 3,988,633 | 10/1976 | Shurgan et al. | 313/493 |
| 4,508,993 | 4/1985 | Anderson | 313/493 X |
| 4,736,134 | 4/1988 | Lagushenko et al. | 313/493 |

Primary Examiner—Leo H. Boudreau
Assistant Examiner—K. Wieder
Attorney, Agent, or Firm—Carlo S. Bessone

[57] ABSTRACT

A low pressure discharge lamp, particularly a compact fluorescent lamp, having a plurality of constricting portions axially spaced apart and extending about the circular periphery of the envelope. The constricting portions, which include defined end segments projecting within the envelope, constrict the plasma discharge and spatially separate at least one of the discharge processes occurring within the plasma discharge and cause the separated process to take place in a different portion within the envelope so that the conditions for energy input and energy dissipation may be independently optimized.

15 Claims, 3 Drawing Sheets

DISCHARGE LAMP HAVING MULTIPLE CONSTRICTIONS

This is a continuation of application Ser. No. 678,928 filed on Dec. 6, 1984, now U.S. Pat. No. 4,736,134.

CROSS-REFERENCE TO RELATED APPLICATIONS

This application discloses subject matter related to that in U.S. Ser. Nos. 678,959; 678,958; 678,929; U.S. Pat. No 4,585,468; and U.S. Pat. No. 4,582,523, filed concurrently herewith, and assigned to the Assignee of this application, but does not claim the inventions claimed in such related applications.

BACKGROUND OF THE INVENTION

This invention relates in general to low-pressure arc discharge lamps and more particularly to compact fluorescent lamps having an increased voltage drop thereacross.

It is often desirable to substantially increase the voltage drop in a low-pressure mercury discharge lamp without decreasing the efficiency of the discharge in producing UV radiation. This is especially true when it is desirable to keep the arc length of the lamp as short as possible and consequently minimize the overall physical dimensions of the lamp while maintaining the same light output. This is especially important in the case of compact fluorescent lamps in which effort is made to obtain the maximum possible light output from the smallest possible volume.

The positive column of a typical low-pressure discharge, such as the mercury argon discharge that forms the basis for the fluorescent lamp, is characterized by the fact that the properties of the plasma are independent of Z, the dimension along the arc length axis. The electron density, the electric field, and the electron energy distribution are all constant and independent of Z. Thus, if positive column length were to be increased at constant discharge current, the only properties of the lamp that would change would be total operating voltage (i.e., arc drop), total power, and total light output, all of which would increase linearly with increasing length, since every incremental length of the positive column is the same as every other.

There are three important processes that occur within the plasma discharge in every discharge lamp: (1) the gain of energy by the electrons in the plasma from the axial electric field established when a predetermined voltage is applied across the electrodes, and its redistribution among the electrons to establish an electron energy distribution: (2) the energy losses to the mercury and the starting gas (e.g. argon) by these electrons in a manner such that only the high-energy fraction ($>4.66$ ev) is capable of creating excited atoms that will generate useful radiation, while all electrons (low energy as well as high) can lose energy via useless elastic collisions with gas and mercury atoms, wasted in the form of heat; and finally, (3) the escape of energy of excited atoms in the form of radiation, which in the case of the preferred ultraviolet radiations requires multiple emissions and reabsorptions before the radiation reaches the wall. It can be seen that the fraction of high-energy electrons in the distribution controls the balance between useful energy loss (creation of excited atoms) and wasted energy loss (elastic collisions).

In prior art lamps because of the essential equivalence of every increment of length of the positive column, all three of these processes occur simultaneously in every increment of volume of the column. Moreover, it is well known that since these three processes are not simultaneously optimized by the same choices of discharge parameters, the design of all such discharge lamps is inevitably a compromise balancing favorable changes in one process against unfavorable changes is either or both of the others. It is desirable, then to provide a means of separating at least one of these three discharge processes spatially from the other two, and causing it to take place in a different portion within the discharge envelope, so that the conditions for energy input and energy dissipation may be independently optimized.

The advantages of this separation of functions so far as practical lamps are concerned are two fold, especially with regard to compact fluorescent lamps. First they permit the achievement of relatively high arc drops in limited length of tube, without requiring very small diameter tubes. High efficiency requires that the positive column component of the discharge voltage be large in comparison to the electrode loss, a condition relatively easily achieved with multiply constricted lamps fabricated according to the preferred dimensional ratios outlined hereinafter. The achievement of electron energy distributions having a much enhanced fraction of high energy electrons also permits operation of the lamps at much higher power input per unit volume while still remaining in the approximately linear domain of output versus current. This means that high specific light levels can be reached in small volume lamps at good efficiency, an extremely important consideration for compact lamps. Also, under comparable conditions of high loading, lamps according to the present invention become substantially more efficacious than their straight tubular counterparts.

Major limitations in the prior art discharges result from the fact that the energy distribution of the electrons in a discharge optimized to the best degree hitherto possible is approximately a Maxwellian $$f(E) = (2/kT\sqrt{\pi})\epsilon^{\frac{1}{2}}e^{-\epsilon}; \ \epsilon = E/kT$$

where
  E = electron energy
  k = Boltzmann's constant
  T = electron temperature.

At the typical electron temperature in a prior art fluorescent lamp, it is a characteristic of the Maxwellian distribution that only approximately one percent of the electrons have energy enough to create an excited atom, whereas all of them can make wasteful elastic collisions with gas atoms. It is possible, of course, to arrange conditions such that the electron temperature of the distribution is higher, in order to have a higher fraction of the electrons with energies greater than 4.66 ev. This is accomplished, however, only by reducing the diameter, or decreasing the gas filling pressure, both of which result in more rapid loss of high-energy electrons to the walls, thereby adversely affecting the efficiency. Finally, in actual lamp conditions, the losses of high-energy electrons from the distribution (either as a result of excitation of mercury or as a result of losses to the walls) are sufficiently rapid that the high-energy tail of a Maxwellian distribution cannot be fully populated by energy input processes; in short, the already small fraction of electrons that are able to do useful work is reduced still further.

A further disadvantage of this deficiency results from the fact that low-energy electrons can collide with excited mercury atoms and remove their energy, creating high-energy electrons and atoms in the lowest or ground state from which they cannot radiate. In the limit of very large collision rate (i.e., high electron density), it is plain that the fraction of atoms that can be in the excited state and emit radiation is dependent only on the fraction of high-energy electrons versus the fraction of low-energy electrons, and becomes independent of the total number density of electrons, and therefore independent of discharge current density. In this domain, useful output becomes a constant, while losses continue to increase, so that efficiency declines drastically with increasing current density.

As a consequence of this effect, if current density is increased from low values toward high in a fluorescent lamp, the number of excited atoms (and consequently the radiation output) increases linearly at low currents, and approaches a constant value essentially independent of current at high values of current density. The only mechanism hitherto available to the lamp designer to ameliorate this condition has been to reduce tube diameter and gas pressure to permit higher electron temperature and consequent higher fraction of high energy electrons, with the disadvantages already outlined above.

Fluorescent lamps have been made in the past which attempt to increase the voltage drop across the lamp by means of indentations or grooves in the envelope. Examples of such lamps having a plurality of individual indentations formed in a periodic manner along the envelope to increase the effective arc stream length are shown in U.S. Pat. Nos. 2,916,645; 2,973,447; and 3,098,945. These configurated lamps which have elongated tubular envelopes with non-circular cross-sections are generally complicated and consequently rather expensive to manufacture.

Another lamp is shown in U.S. Pat. No. 3,988,633 in which a plurality of separate and continuous grooves are used to increase the radiation of the lamp by altering the wall recombination rate of the plasma ions with the phosphor. The additional voltage generated in this type of lamp is not substantial i.e., much less than 0.25 volts per groove.

The prior art did not recognize the importance of minimizing the thickness of the constricted portion and of having as sharp a transition as possible, the more closely to approach the condition of a step-function change in potential in a very short distance.

BRIEF SUMMARY OF THE INVENTION

It is, therefore, an object of this invention to obviate the disadvantages of the prior art.

It is a more particular object of this invention to provide a novel means for greatly increasing the voltage drop in a low-pressure arc discharge lamp which is relatively simple to manufacture.

These objects are accomplished, in one aspect of the invention, by the provision of a fluorescent lamp having an envelope of substantially circular configuration in cross-section containing two axially opposed end portions and having an electrode located within a respective one of the axially opposed end portions. The envelope is coated on the interior surface with at least one phosphor layer and encloses an inert starting gas and a quantity of mercury for producing a plasma discharge when a predetermined voltage is applied across the electrodes. Means are provided within the envelope for spatially separating at least one of the discharge processes occurring within the plasma discharge and for causing the separated process to take place in a different portion within the envelope so that the conditions for energy input and energy dissipation may be independently optimized.

In a preferred embodiment, the envelope includes a plurality of constricting portions axially spaced apart for constricting the plasma discharge in order to provide an increase in the lamp voltage. Each of the constricting portions which extends substantially about the circular periphery of the envelope contains a defined end segment projecting within the envelope. Each of the constricting portions contain opposed sidewalls which form substantially the same angle with an imaginary line parallel to the arc length axis.

DETAILED DESCRIPTION OF PREFERRED EMBODIMENTS

Figure 1:
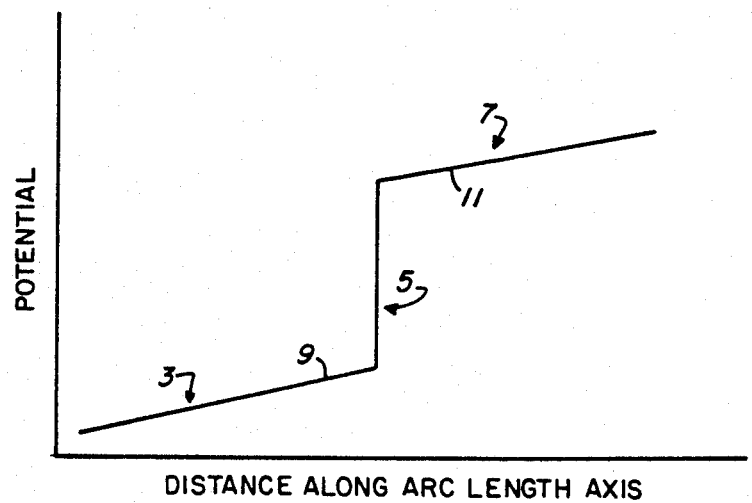
FIG. 1 is a diagram of the potential along an arc length axis.

For a better understanding of the present invention, together with other and further objects, advantages, and capabilities thereof, reference is made to the following disclosure and appended claims taken in conjunction with the above described drawings.

Low-energy electrons are accelerated by the axial electric field, gaining energy as they travel along the arc length axis. They make elastic collisions with gas atoms, in each of which they may lose a small amount of energy, and experience deflection of direction in a random manner. They collide with other electrons, exchanging energy in a billiard ball manner, sharing the total energy equally on the average, because of equal mass. Because there are far fewer electrons than gas atoms in the plasma, electron-electron collisions are relatively infrequent in comparison to electron-gas-atom collisions. When an electron, by pure chance, traverses a significant length of positive column without experiencing too many electron-electron collisions, it will gain a substantial (several ev) amount of energy from the field. Its collision cross-section with respect to other electrons being a strongly decreasing function of relative velocity, once it has achieved a sufficient energy, the probability that it will share energy with other electrons becomes less and less. Consequently, the electron continues to gain energy from the field until it has enough energy to make an inelastic collision exciting a mercury atom, and losing a substantial proportion of its energy. At this point, it becomes susceptible to collision by other electrons, sharing its residual energy and merging with the rest of the electrons in the energy distribution. The fraction of the electrons in the high-energy tail of the distribution then becomes critically dependent on the relative energy gain from the field per unit drift distance along the field and the energy loss by high-energy electrons per unit drift distance along the field.

If we imagine an ensemble of high energy electrons at a certain Z-position along the arc length axis in the discharge, assuming for the moment that electric field is zero, this group of electrons will diffuse along the arc length axis, making elastic collisions with gas atoms which result in changes in direction but little loss of energy per collision; they will therefore retain almost all of their energy until they make an inelastic collision in which they surrender a large fraction of their energy, creating an excited atom, and effectively resulting in the disappearance of a high-energy electron and appearance of a low-energy electron. It can be shown that approximately in the field-free case that the density of high-energy electrons decreases exponentially with distance along the arc length axis from the starting point, with an exponential constant having the dimensions of distance, which is called the electron energy relaxation distance $d_r$. The electron energy relaxation distance $d_r$ is a well known quantity which, in a low pressure positive column discharge, is defined by the equation:

$$d_r^{-1} = [(3P_{Hg}Q_{in}^{Hg} + 3P_R Q_{in}^R)(P_{Hg}Q^{Hg} + P_R Q^R)]^{\frac{1}{2}}$$

where $P_{Hg}$ is the mercury number density in the vapor
$P_R$ is the rare gas number density
$Q_{in}^{Hg}$ is the total inelastic scattering cross-section for the electrons by Hg.
$Q_{in}^R$ is the total inelastic scattering cross-section for the electrons by gas
$Q^{Hg}$ is the total scattering cross-section for electrons by Hg.
$Q^R$ is the total scattering cross-section for electrons by gas.

It will be appreciated that in the real case, there will be an electric field along the arc length axis which will result in energy gain occurring simultaneously as the electrons drift, make inelastic collisions and disappear as high energy electrons from the distribution. In the conventional fluorescent lamp, the electron energy relaxation distance may be a few tenths of a centimeter, while axial electric fields are only of the order of a few tenths of a volt per millimeter. The total possible energy input to high-energy electrons over the electron energy relaxation distance is therefore of the order of a few tenths of an electron volt, relatively negligible in comparison to the energy itself, e.g. 5 ev. This is not only not sufficient to produce a higher fraction of high-energy electrons than the Maxwellian, it is actually insufficient to maintain as large a fraction of high-energy electrons as a Maxwellian in the face of excitation and wall losses of high-energy electrons.

On the other hand, if the axial electric fields are sufficiently high (and/or electron energy relaxation distance sufficiently long) that the energy gain by high-energy electrons in drifting a distance along the arc length axis equal to the electron energy relaxation distance is comparable to the electron energy itself, then a very high population of high-energy electrons can be maintained indefinitely, not only equal to a Maxwellian-tail population, but even greater.

Figure 2:
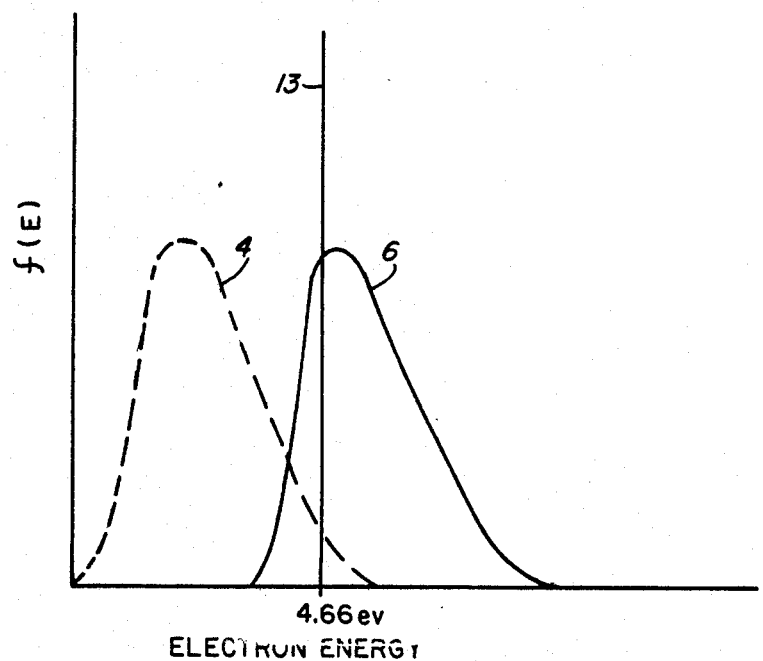
FIG. 2 is a diagram of the electron energy distribution.

By way of illustration as shown in FIG. 1, we may employ a reductio ad absurdum example of a discharge tube comprising a region of uniform low electric field 3, establishing a substantially Maxwellian distribution, followed by a region of very short extent of very high electric field 5, of such dimensions and field as to result in essentially a step-function in potential, followed by a third region of low electric field 7. On the upstream side 9 of the high-field region 5 in FIG. 1 the electron energy distribution is substantially Maxwellian, as shown by the dotted curve 4 in FIG. 2. Upon passage through the step-function of potential, the entire distribution is displaced upward in energy by an amount equal to the potential step, since that change in potential took place over a distance very small in comparison to the electron energy relaxation distance. The resulting electron energy distribution on the downstream region 11 in FIG. 1 is illustrated schematically by the solid curve 6 in FIG. 2. It is very clear that the latter distribution has a dramatically larger fraction of electrons of energy sufficient to excite mercury atoms to the ultraviolet emitting state than the former, as illustrated by the fraction to the right of the vertical line 13 drawn at an energy at 4.66 ev.

Accordingly, the ratio of useful energy losses by the electrons (by excitation of mercury) to wasted energy losses (elastic collisions with gas atoms) is greatly increased. In addition the ratio of excitation collisions by high-energy electrons to de-excitation collisions by low-energy electrons is dramatically increased to favor excitation. Consequently, the limiting level of excited atom density and radiation output that is reached at very high electron and current densities is dramatically increased by the latter distribution; as a result the power per unit volume which can be input before onset of saturation of output and declining efficiency can be enormously increased. As already noted, this is a vital concern with regard to compact fluorescent lamps.

Note, however, that only a limited region along the flow path of the electrons to the anode is so affected, say for downstream distances of the order of a diameter. In order to be of practical utility, then, we must have a sequence of such step-functions of potential progressing down the discharge tube from anode to cathode. In fact, since as we have already seen, the low-field regions are at a disadvantage in comparison to the high-field regions, it is desirable that a very large fraction of the total voltage drop across the lamp take place in high-field regions, with regions in between sequential high-field regions having little or no potential gradient, and spanned by little or no potential drop.

It is plain, moreover, that a continuum of possible ratios of voltage-drop per electron energy relaxation distance to excitation potential is possible. Depending on the value of this ratio, there will exist a family of electron energy distributions intermediate between the two cases shown in FIGS. 1 and 2. All of these will be characterized by having a higher proportion of high-energy electrons, with all the advantages pertaining thereto, over those commonly found in discharge lamps embodying uniform axial electric field according to the prior art. Thus, in practical implementation of the instant invention, we shall not find it necessary to achieve the actual step-function in potential shown in FIG. 1, but instead a sequence of regions wherein the electric field is substantially higher than that commonly found in discharges according to the prior art and extending over these electron energy relaxation distances, separated by alternate regions in which the electric field is very must smaller than that commonly found in discharges of the prior art.

Figure 3:
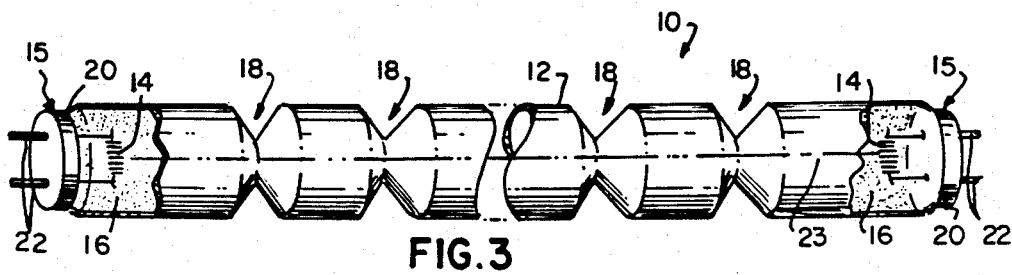
FIG. 3 is a perspective view of a lamp according to the invention.

To achieve this kind of potential distribution we make use of a geometrical construction shown in FIG. 3. FIG. 3 shows a fluorescent lamp 10 according to a preferred embodiment of the invention. Lamp 10 includes a substantially linear envelope 12 of substantially circular configuration in cross-section which is generally made of light-transmitting soda-lime or lead glass. Envelope 12 contains two axially opposed end portions 15. An electrode 14 is located within a respective one of the axially opposed end portions 15 of envelope 12. At least one phosphor layer 16 is positioned on the interior surface of envelope 12. Envelope 12 encloses an ionizable medium including a quantity of mercury and an inert starting gas. The gas may consist of argon, neon, helium, etc., or a combination thereof at a low pressure in the range of about 1 to 4 mmHg. Lamp 10 has an end cap 20 with corresponding electrical terminals 22 attached at each end. Although an end cap 20 with a pair of terminals 22 is shown, the present invention is also applicable to other end cap types, for example single pin or recessed pins. An arc length axis 23 is defined by an imaginary line extending from one electrode to the other electrode passing through the cross-sectional midpoint of the entire envelope.

Figure 4:
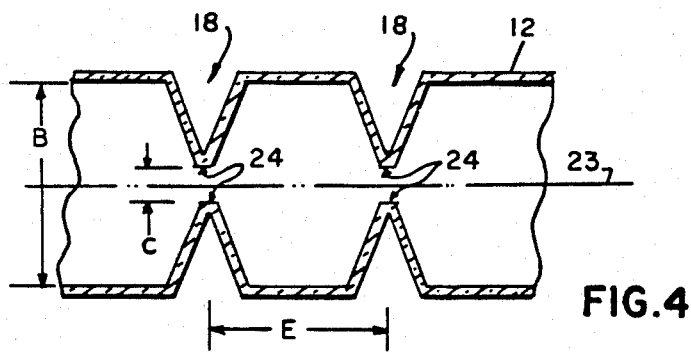
FIG. 4 is a partial longitudinal cross-sectional view of the lamp of FIG. 1.

Envelope 12 includes a plurality of constricting portions 18, axially spaced apart and each extending substantially about the periphery of envelope 12. It is not necessary for constricting portions 18 to extend completely around envelope 12. Each of the constricting portions 18 as shown in the partial cross-sectional views of FIGS. 4 and 5 contains a defined end segment 24 projecting within envelope 12. End segment 24 is that section of constricting portion 18 which deviates from the angle of sidewalls 26. The cross-section of segment 24 need not have a flat surface (as shown for 24) but may have a curved or bowed surface, illustrated as 24'. The potential gradient in the region immediately upstream of the constriction and through the constriction must necessarily be substantially higher than average to force a larger current density through the smaller area to maintain the total current constant. By suitable choice of the ratio of the maximum internal diameter B of envelope 12 to the minimum internal diameter C, and of the length A of end segment 24, we can insure that the electric field in this region is sufficiently large that the potential drop per unit electron energy relaxation distance is sufficiently large to produce substantial beneficial alteration of the electron energy distribution, as measured by the changes in electrical and luminous properties of the lamps. By proper choice of the length A, we can moreover accomplish one of the other objectives of the present invention, to separate the region of energy input to the electrons from the region where they dissipate that energy by exciting and ionizing collisions with mercury as well as elastic collisions with gas atoms. Because the extent of the region over which the electrons gain energy is so small, and because they are accelerated through it so rapidly by the high field, there is not sufficient time for them to lose the energy gained before they have emerged into the larger diameter region of the tube.

It is, then, in the maximum internal diameter areas that the electrons lose their energy, creating excited atoms as well as colliding elastically with gas atoms. Thus, it can be seen that this geometrical construction, when fabricated according to preferred dimensional ratios, accomplishes our objective to spatially separate the process of energy input from the process of energy loss. The diameter and extent of the maximum internal diameter areas are then dictated by radiation escape considerations. Because of the much larger cross-sectional area of this portion of the lamp, the current density at constant total current therein is low and the corresponding electric field is low.

Theoretically, the length A of end segment 24 should not be more than the electron energy relaxation distance $d_r$ for the conditions of the discharge within the lamp (i.e., gas type, gas pressure, electron temperature, etc). However, since electron energy relaxation is known to be a continuously occurring process, the length A is not expected to be exactly $d_r$. Empirically, the length A of end segment 24 can be within the range of from about 0.02 to 1 times the electron energy relaxation distance $d_r$. Generally A is within the range of from about 0.1 millimeter to about 2.0 millimeters. For example, for a neon fill gas at a pressure of 2 torr at 25° C., $d_r$ equals approximately 5 mm; for argon at a pressure of 2 torr at 25° C., $d_r$ equals approximately 1.5 mm.

In the preferred embodiment of the invention, constricting portions 18 are all of substantially uniform depth and shape and are spaced apart equally by a separation distance E. The distance E is measured axially within the envelope between the midpoints of the end segments of a pair of adjacent constricting portions. Changing the value E affects both the voltage generated across the lamp and also the efficiency of light generated. It has been found that E should be equal to at least the difference between the maximum internal diameter B and the minimum internal diameter C of the envelope for proper relaxation of the plasma discharge. Typical values for the separation distance are within the range of from about 25 millimeters to about 100 millimeters.

Significant increases in lamp voltage can be achieved when the ratio of the maximum internal diameter B of the envelope to the minimum internal diameter C is within a range of ratios B:C of about 2:1 to 10:1 or greater. At the same time, the length A should not be more than the electron energy relaxation distance $d_r$ of the lamp.

Figure 5:
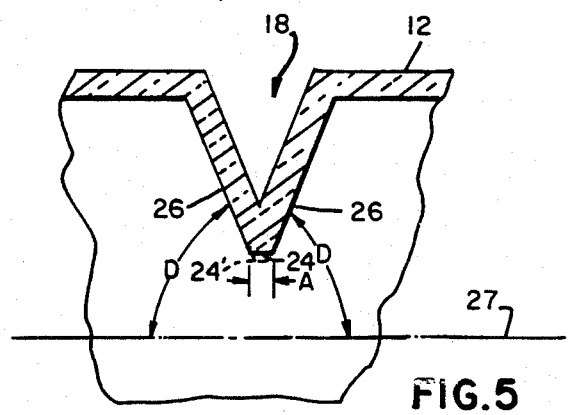
FIG. 5 is an enlarged partial cross-sectional view.

As best shown in the enlarged partial cross-sectional view of FIG. 5, the cross-sectional shape of each constricting portion 18 of envelope 12 preferably is substantially in the form of a V having an end segment 24 and a pair of opposed sidewalls 26. Constricting portion 18, in a preferred embodiment, is symmetrical about its center line; or in other words, each of the sidewalls 26 forms the same angle D with an imaginary line 27 parallel to the arc length axis 23. Preferably the sidewall angle D is within the range of from about 45 degrees to about 90 degrees.

In one example of a fluorescent lamp made in accordance with the invention, the envelope 12 of linear configuration was made of T17 size having a maximum internal diameter B equal to about 52 mm. Three constricting portions were formed in the envelope having a separation distance E equal to about 50 mm, an axial end segment length A of approximately 1 mm, and a minimum internal envelope diameter C of 6 mm and sidewall angle D of 45°. The resulting ratio B:C was equal to 8.7:1. The fill gas used was 100 percent neon at a pressure of about 2.0 mmHg.

The following table shows the electrical parameters measured for both the above mentioned constricted lamp along with a control lamp (a similar T17 lamp without constricting portions) operating on a 120 volt, 60 cycle lag-type circuit. The arc length in both lamps was approximately 120 mm.

|  | Control Lamp | Constricted Lamp |
|---|---|---|
| Volts | 23.0 | 53.0 |
| Amperes | .450 | .460 |
| Watts | 10.0 | 23.0 |
| Lumens | 410 | 1000 |

The above table shows an increase in both lamp voltage and wattage for the constricted lamp. The constricted lamp yielded approximately 10 volts for each constriction.

The exact dependence of the increase in voltage on the parameters A,B,C,D and E are difficult to calculate due to the presence of many different interrelated processes which contribute to the discharge. However, certain general empirical relationships can be observed. Increases in the voltage per constriction were directly proportional to increases in the ratio B:C, the sidewall angle D, or the separation distance E.

Although the specific values of the voltage per constriction may vary for different values of the parameters A,B,C,D and E, a general trend in which a B:C constriction ratio of 2:1 to 3:1 yields a voltage per constriction of about 6 volts has been observed in other examples. The values used in examples for A were 1 mm to 2 mm; for B were 35 mm to 64 mm; for C were 3 mm to 15 mm; for D were 45° to 90°; for E were 25 mm to 40 mm. A neon gas fill of 2 torr and mercury vapor density appropriate for 25° C. to 50° C. were used.

Figure 6:
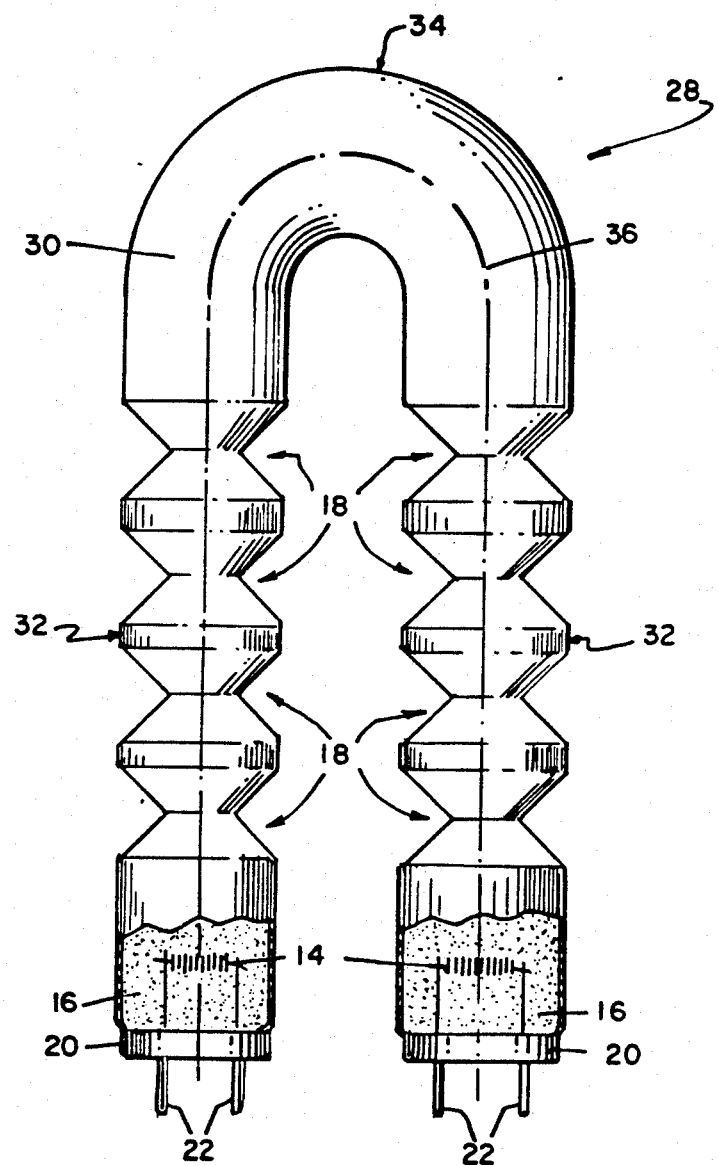
FIG. 6 is another embodiment of the invention showing a plan view of a U-lamp.

FIG. 6 shows another embodiment of the invention. Lamp 28 comprises an envelope 30 of a U-shaped configuration having two axially opposed end portions, an axially curved portion 34 and a pair of leg portions 32. At least one phosphor layer 16 is positioned on the interior surface of envelope 30. An electrode 14 is located within each of the end portions of envelope 30. Envelope 30 encloses an ionizable medium including a quantity of mercury and an inert starting gas. Lamp 28 has an end cap 20 with corresponding electrical terminals 22 attached at each end. The leg portions 32 of the envelope 30 include a plurality of constricting portions 18 according to the invention, and the curved portion 34 contains no constricting portions. An arc length axis 36 is defined by an imaginary line extending from one electrode to the other electrode passing through the cross-sectional midpoint of the entire envelope.

As an example of a U-shaped fluorescent lamp made in accordance with the invention, a 253 mm arc length T8 lamp was made with 8 constricting portions (4 in each leg portion). The maximum internal diameter B was equal to about 23.4 mm. The separation distance E equaled about 19 mm, the axial end segment length A was approximately 1 mm, the envelope minimum internal diameter C was 9.5 mm, and the sidewall angle D was 45°. The resulting ratio B:C was equal to about 2.5:1. The lamp contained 100% neon fill gas at 2 mmHg.

The following table shows the electrical and photometric parameters of the above described U-shaped lamp (with constrictions on leg portions only) and a control U-shaped lamp (without constrictions) operating on a 120 volt, 60 cycle lag-type circuit:

|  | Control Lamp | Constricted Lamp |
|---|---|---|
| Volts | 50.0 | 60.0 |
| Amperes | .350 | .350 |
| Watts | 15.0 | 19.0 |
| Lumens | 800 | 1100 |

The manufacture of an envelope with constrictions of the form as described may be accomplished by heating an envelope of round cross-sectional configuration to the softening point of the glass. While the envelope is under pressure, the constrictions are pressed into the envelope wall by a mold. Alternatively, the constrictions can be formed by a ribbon machine type operation in which the heated envelope is blown into shape within a mold.

After the glass envelope is formed, the remaining steps for making a complete fluorescent, low pressure discharge lamp are identical to those for conventional lamps. Due to the relatively large opening at each constriction, a normal phosphor coating process, such as application of a slurry of phosphor in an organic or water base, can be used. The phosphor coated envelope is then processed into a fluorescent lamp in the usual conventional manner.

While there have been shown what are at present considered to be preferred embodiments of the invention, it will be apparent to those skilled in the art that various changes and modifications can be made herein without departing from the scope of the invention as defined by the appended claims.

We claim:

1. A fluorescent lamp comprising:
   an envelope having a substantially circular configuration in cross-section, said envelope having two axially opposed end portions;
   first and second electrodes, each of said electrodes located within a respective one of said axially opposed end portions;
   at least one phosphor layer positioned on the interior surface of said envelope;
   an ionizable medium enclosed within said envelope including an inert starting gas and a quantity of mercury for producing a plasma discharge when a predetermined voltage is applied across said electrodes, said plasma discharge being characterized by three processes, including:
   (a) the gain of energy by the electrons in said plasma discharge from the axial electric field established by said voltage and the redistribution of said energy among said electrons to establish an electron energy distribution,
   (b) the energy losses to said mercury and said starting gas by said electrons and
   (c) the escape of energy of excited atoms in the form of radiation; and
   means provided within said envelope in the form of a plurality of constricting portions, each of said constricting portions having a defined end segment with a specific axial length, said means being sufficient to separate at least one of said discharge processes spatially from the remainder of said discharge processes and for causing said separated process to take place in a different portion within said envelope to permit the conditions for energy input and energy dissipation to be independently optimized.

2. The fluorescent lamp of claim 1 wherein said plurality of constricting portions are axially spaced apart, each of said constricting portions extending substantially about the circular periphery of said envelope and projecting therein, and each of said constricting portions having opposed sidewalls forming substantially the same angle with an imaginary line parallel to said arc length axis.

3. The fluorescent lamp of claim 2 wherein said envelope is of substantially linear configuration.

4. The fluorescent lamp of claim 2 wherein said constricting portions are of substantially uniform depth and shape.

5. The fluorescent lamp of claim 4 wherein the cross-sectional shape of each of said constricting portions is substantially in the form of a V.

6. The fluorescent lamp of claim 2 wherein the separation distance between each of said spaced apart constricting portions is substantially the same.

7. The fluorescent lamp of claim 6 wherein said separation distance is approximately equal to at least the difference between the maximum internal diameter and the minimum internal diameter of said envelope.

8. The fluorescent lamp of claim 7 wherein said separation distance is within the range of from about 25 millimeters to about 100 millimeters.

9. The fluorescent lamp of claim 7 wherein the ratio of said maximum internal diameter to said minimum internal diameter is within the range of from about 2:1 to about 10:1.

10. The fluorescent lamp of claim 2 wherein said sidewall angle of each of said constricting portions is within the range of from about 45 degrees to about 90 degrees.

11. The fluorescent lamp of claim 1 wherein said envelope contains at least one axially curved portion.

12. The fluorescent lamp in claim 11 wherein said envelope is of substantially U-shaped configuration comprising an axially curved portion and at least two leg portions.

13. The fluorescent lamp in claim 12 wherein said curved portion contains no constricting portions.

14. The fluorescent lamp of claim 1 wherein the ratio of the maximum internal diameter of said envelope to the minimum internal diameter of said envelope is greater than about 2:1.

15. A fluorescent lamp comprising:
an envelope having a substantially circular configuration in cross-section, said envelope having two axially opposed end portions;
first and second electrodes, each of said electrodes located within a respective one of said axially opposed end portions;
at least one phosphor layer positioned on the interior surface of said envelope;
an ionizable medium enclosed within said envelope including an inert starting gas and a quantity of mercury for producing a plasma discharge when a predetermined voltage is applied across said electrodes, said plasma discharge being characterized by three processes, including:
(a) the gain of energy by the electrons in said plasma discharge from the axial electric field established by said voltage and the redistribution of said energy among said electrons to establish an electron energy distribution,
(b) the energy losses to said mercury and said starting gas by said electrons and
(c) the escape of energy of excited atoms in the form of radiation; and
means provided within said envelope in the form of a plurality of constricting portions each having a defined end segment with an axial length of not more than approximately 5.0 millimeters, said means being sufficient to separate at least one of said discharge processes spatially from the remainder of said discharge processes and for causing said separated process to take place in a different portion within said envelope to permit the conditions for energy input and energy dissipation to be independently optimized.

* * * * *